United States Patent
Koga

(10) Patent No.: US 8,038,197 B2
(45) Date of Patent: Oct. 18, 2011

(54) POWER SEAT APPARATUS FOR VEHICLE

(75) Inventor: Yoshitaka Koga, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 177 days.

(21) Appl. No.: 12/556,322

(22) Filed: Sep. 9, 2009

(65) Prior Publication Data
US 2010/0065708 A1 Mar. 18, 2010

(30) Foreign Application Priority Data
Sep. 12, 2008 (JP) ................................. 2008-234619

(51) Int. Cl.
B60N 2/02 (2006.01)

(52) U.S. Cl. .................................................. 296/65.18

(58) Field of Classification Search ............... 296/65.18, 296/65.13, 65.14; 248/424, 429, 430
See application file for complete search history.

(56) References Cited

U.S. PATENT DOCUMENTS

| | | | | |
|---|---|---|---|---|
| 2,919,744 A | * | 1/1960 | Tanaka | 248/419 |
| 5,125,611 A | * | 6/1992 | Cox | 248/429 |
| 5,348,262 A | * | 9/1994 | Isomura | 248/430 |
| 5,349,878 A | * | 9/1994 | White et al. | 74/89.14 |
| 5,393,028 A | * | 2/1995 | Satoh et al. | 248/429 |
| 7,325,851 B2 | * | 2/2008 | Ito et al. | 296/65.13 |
| 7,815,159 B2 | * | 10/2010 | Moriyama et al. | 248/430 |
| 2009/0236488 A1 | * | 9/2009 | Koga et al. | 248/429 |
| 2010/0133408 A1 | * | 6/2010 | Umezaki et al. | 248/429 |
| 2011/0031774 A1 | * | 2/2011 | Koga | 296/65.15 |

FOREIGN PATENT DOCUMENTS
JP 2002-192996 7/2002

OTHER PUBLICATIONS
U.S. Appl. No. 12/749,895, filed Mar. 30, 2010, Koga et al.

* cited by examiner

Primary Examiner — Kiran B. Patel
(74) Attorney, Agent, or Firm — Oblon, Spivak, McClelland, Maier & Neustadt, L.L.P.

(57) ABSTRACT

A power seat apparatus for a vehicle includes a lower rail, an upper rail, a screw member, a feed nut member fixed to the lower rail and meshed with the screw member, a retention member fixed to the upper rail, a fitting member rotatably held by the retention member and fixed to the screw member, a gear box mounted on the retention member and rotatably supporting an output rotation member, a drive unit transmitting a rotation drive force to the screw member, and first and second cut-and-lifted portions formed at first and second longitudinal walls of the upper rail respectively, the cut-and-lifted portions making contact with the fitting member when a load is applied to the screw member in an axial direction thereof to distribute the load to the upper rail, the cut-and lifted portions being formed by bending portions of the first and second longitudinal walls.

6 Claims, 10 Drawing Sheets

POWER SEAT APPARATUS FOR VEHICLE

CROSS REFERENCE TO RELATED APPLICATIONS

This application is based on and claims priority under 35 U.S.C. §119 to Japanese Patent Application 2008-234619, filed on Sep. 12, 2008, the entire content of which is incorporated herein by reference.

TECHNICAL FIELD

This disclosure relates to a power seat apparatus for a vehicle.

BACKGROUND

A known power seat apparatus is disclosed in JP2002-192996A (Reference 1). The power seat apparatus disclosed in Reference 1 includes a lower rail fixed to a vehicle floor, an upper rail supported by the lower rail so as to be slidable in a longitudinal direction of the vehicle and supporting a vehicle seat, and a screw shaft provided between the lower rail and the upper rail so as to extend in a direction where the upper rail is slidable. The power seat apparatus further includes a nut member fixed to the lower rail to engage with the screw shaft, a gearbox supported by the upper rail and connected to one end of the screw shaft, and a motor transmitting a drive force to the screw shaft via the gearbox. The screw shaft is driven to rotate by rotations of the motor to thereby slide the upper rail relative to the lower rail in the longitudinal direction of the vehicle.

According to Reference 1, as a security measure for a possible application of a large load to the vehicle seat, two washers and a collar are provided at the screw shaft in a manner that the collar is arranged between the two washers. Then, a recess, which is formed by making two cuts in a side face of the upper rail and bending a portion between the two cuts inward, faces a portion between the washers so as to be arranged between the two washers. As a result, the excessive load applied to the vehicle seat (specifically, the upper rail) is transmitted, through the recess that makes contact with either of the washers, to the lower rail to thereby endure the excessive load.

However, according to the Reference 1, the two washers and the collar are additionally provided, thereby increasing a cost and an assembly time.

A need thus exists for a power seat apparatus for a vehicle which is not susceptible to the drawback mentioned above.

SUMMARY

According to an aspect of the this disclosure, a power seat apparatus for a vehicle includes a lower rail provided at a vehicle floor, an upper rail slidably supported by the lower rail and holding a seat for the vehicle, a screw member rotatably arranged between the lower rail and the upper rail and extending in a direction where the upper rail is slidable, a feed nut member fixed to the lower rail and meshed with the screw member, a retention member fixed to the upper rail, a fitting member rotatably held by the retention member and fixed to the screw member, a gear box mounted on the retention member and rotatably supporting an output rotation member that is rotatably connected to the screw member, a drive unit transmitting a rotation drive force to the screw member by means of the output rotation member supported by the gear box, and first and second cut-and-lifted portions formed at first and second longitudinal walls of the upper rail respectively, the cut-and-lifted portions making contact with the fitting member when a load is applied to the screw member in an axial direction thereof to distribute the load to the upper rail, the cut-and lifted portions being formed by bending portions of the first and second longitudinal walls.

According to another aspect of this disclosure, a power seat apparatus for a vehicle includes a lower rail provided at a vehicle floor, an upper rail slidably supported by the lower rail and holding a seat for the vehicle, a screw member arranged between the lower rail and the upper rail and fixed to the lower rail, the screw member extending in a direction where the upper rail is slidable, a retention bracket fixed to the upper rail, a support member supported by the retention bracket, a feed nut member supported by the support member and meshed with the screw member, a drive unit transmitting a rotation drive force to the nut member, and first and second cut-and-lifted portions formed at first and second longitudinal walls of the upper rail respectively, the cut-and-lifted portions making contact with the retention bracket when a load is applied to the feed nut member in an axial direction of the screw member to distribute the load to the upper rail, the cut-and lifted portions being formed by bending portions of the first and second longitudinal walls.

BRIEF DESCRIPTION OF THE DRAWINGS

The foregoing and additional features and characteristics of the disclosure will become more apparent from the following detailed description considered with the reference to the accompanying drawings, wherein.

DETAILED DESCRIPTION

Figure 1:
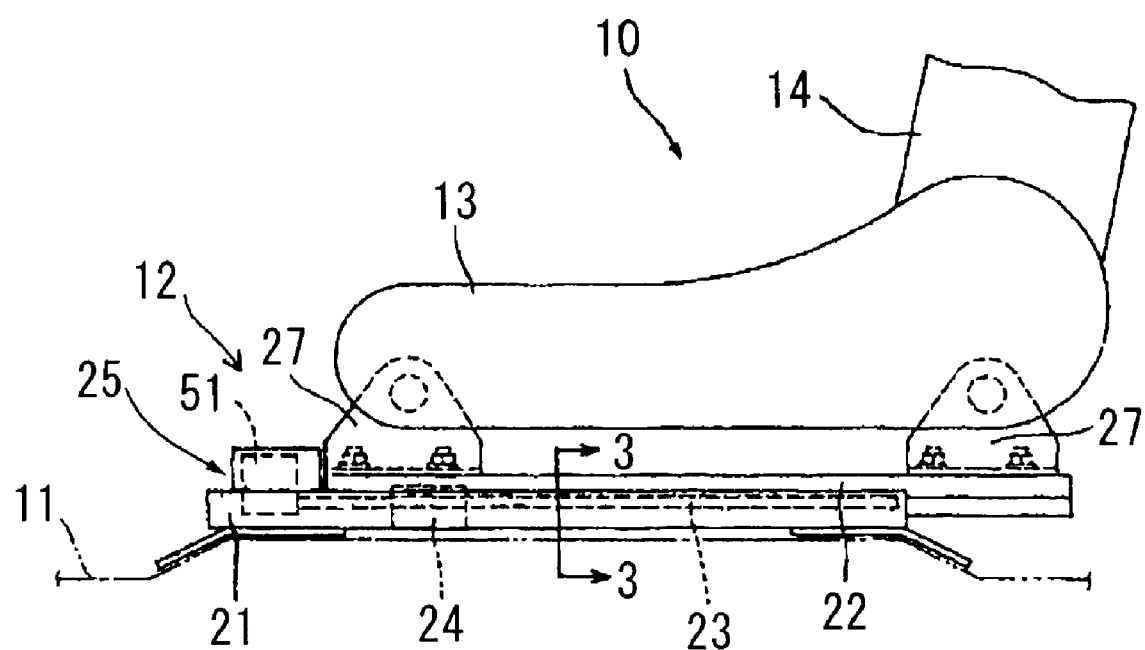
FIG. 1 is a side view of a seat for a vehicle including a power seat slide apparatus according to a first embodiment.

A first embodiment will be explained with reference to the attached drawings. In the first embodiment, directions or orientations such as left, right, front, rear, top, and bottom correspond to those when viewed from a passenger seated on a seat for a vehicle. A seat for a vehicle (hereinafter simply referred to as a seat) 10 provided at a vehicle floor 11 includes a power seat slide apparatus 12 serving as a power seat apparatus according to the present embodiment. The seat 10 includes a seat cushion 13 forming a surface on which the passenger is seated and a seatback 14 forming a surface on which the passenger leans. The seatback 14 is attached to a rear portion of the seat cushion 13 so as to be reclinable relative thereto in a longitudinal direction of the vehicle and is held at a predetermined adjusted angle by means of a known reclining device.

Figure 2:
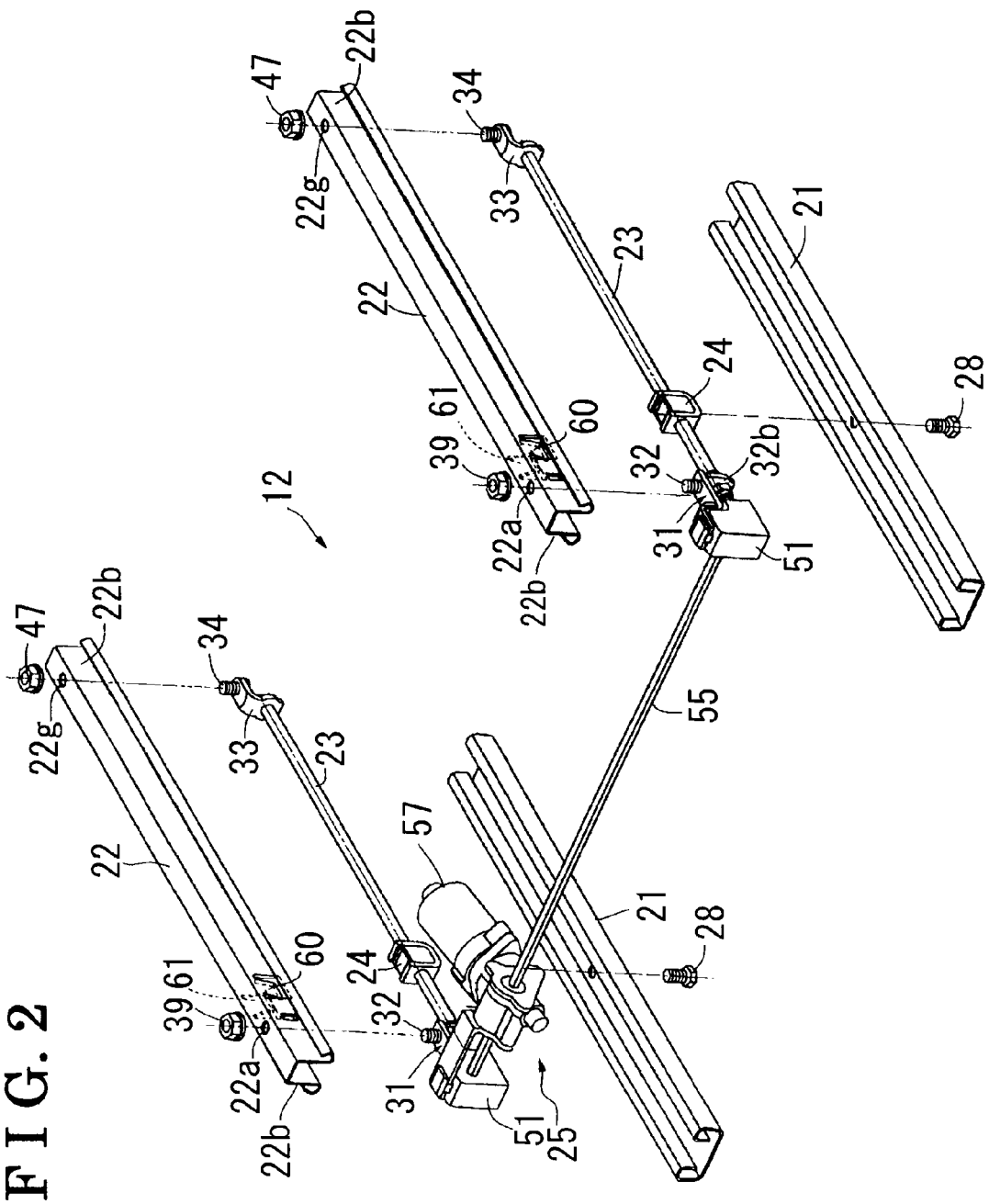
FIG. 2 is an exploded perspective view of the power seat slide apparatus according to the first embodiment.

The power seat slide apparatus 12 mainly includes a pair of lower rails 21, a pair of upper rails 22, screw shafts 23 each serving as a screw member, feed nut members 24, and a drive unit 25 as illustrated in FIGS. 1 and 2.

Figure 3:
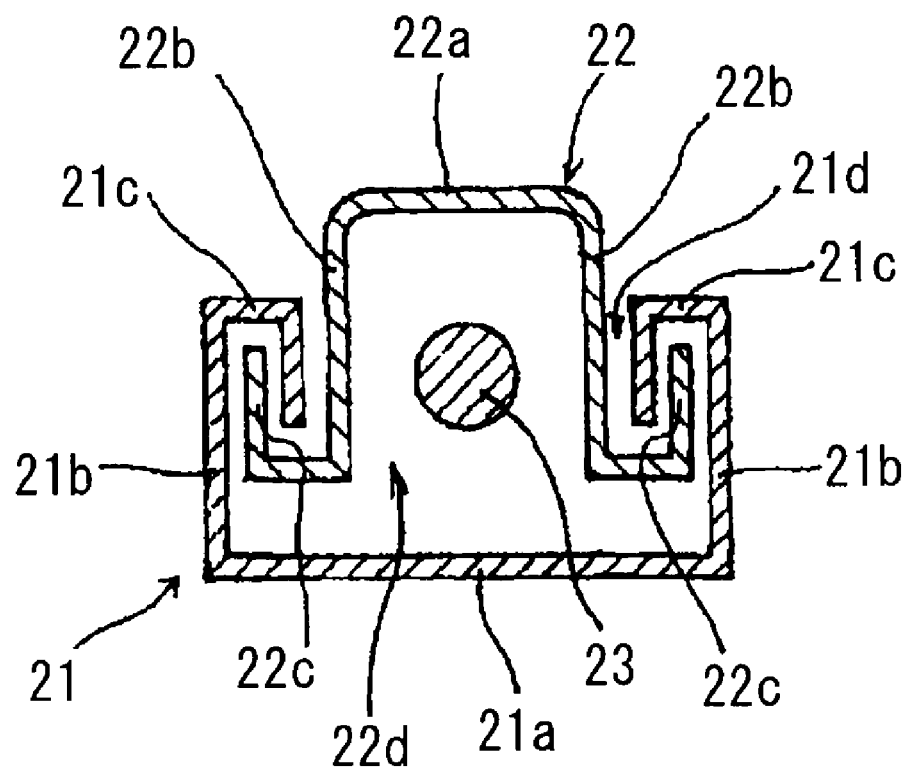
FIG. 3 is a cross-sectional view taken along a line 3-3 shown in FIG. 1.

The pair of lower rails 21 (left and right lower rails), each formed by an elongated rail member, extends in the vehicle longitudinal direction. The lower rails 21 are arranged at right and left sides of the seat 10 in a width direction thereof so as to be in parallel to each other. As illustrated in FIG. 3, each of the lower rails 21 includes a bottom wall 21a, two side walls (left and right side walls) 21b serving as first and second longitudinal walls, and two flange walls (left and right flange walls) 21c. The two side walls 21b extend upwardly from respective end portions (left and right end portions) of the bottom wall 21a. The two flange walls 21c bend inwardly from upper ends of the respective side walls 21b and then extend downwardly. The lower rail 21 also includes an opening portion 21d that opens upwardly to be provided between the two flange walls 21c, thereby forming a substantially U-shape in a cross section. The lower rail 21 is fixed to the vehicle floor 11 at front and rear ends by means of tightening members such as bolts.

The pair of upper rails 22 (left and right upper rails), each formed by an elongated rail member, extends in the vehicle longitudinal direction. The upper rails 22 are arranged at right and left sides of the seat 10 in the width direction thereof so as to be in parallel to each other. As illustrated in FIG. 3, each of the upper rails 22 includes a top wall 22a, two longitudinal walls (left and right longitudinal walls) 22b serving as first and second longitudinal walls, and two flange walls (left and right flange walls) 22c. The two longitudinal walls 22b extend downwardly from respective end portions (left and right end portions) of the top wall 22a. The two flange walls 22c bend outwardly from lower ends of the respective longitudinal walls 22b and then extend upwardly. The upper rail 22 also includes an opening portion 22d that opens downwardly to be provided between the two flange walls 22c, thereby forming a substantially inverse U-shape in a cross section. The upper rail 22 is slidably supported by the lower rail 21 via a roller. In addition, the seat cushion 13 of the seat 10 is fixed onto each of the upper rails 22 via a retention bracket 27 (see FIG. 1).

Figure 4:
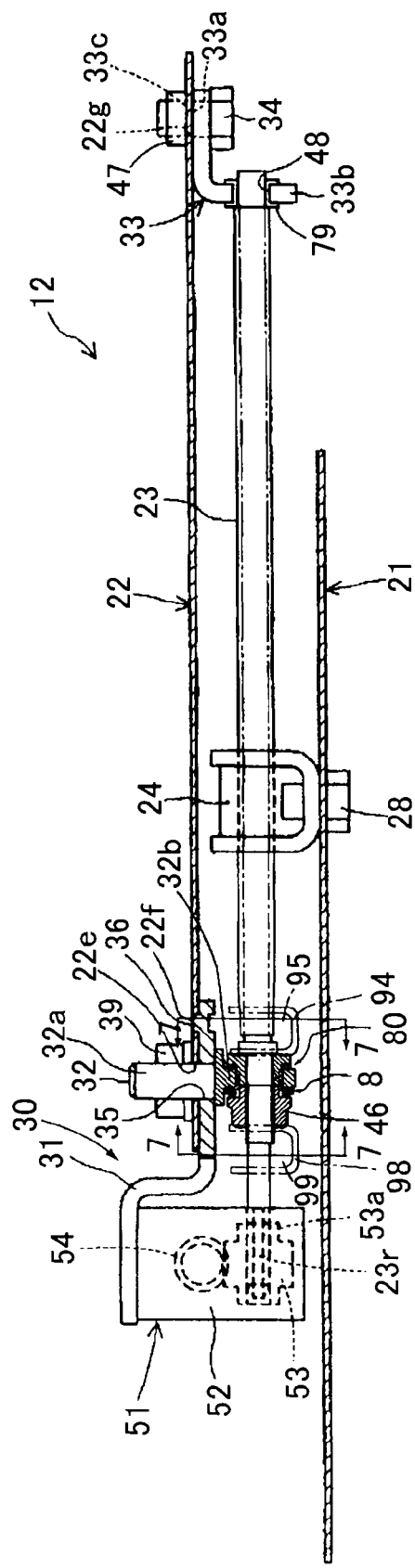
FIG. 4 is a cross-sectional view of the power seat slide apparatus in an axial direction of a screw shaft according to the first embodiment.
Figure 5:
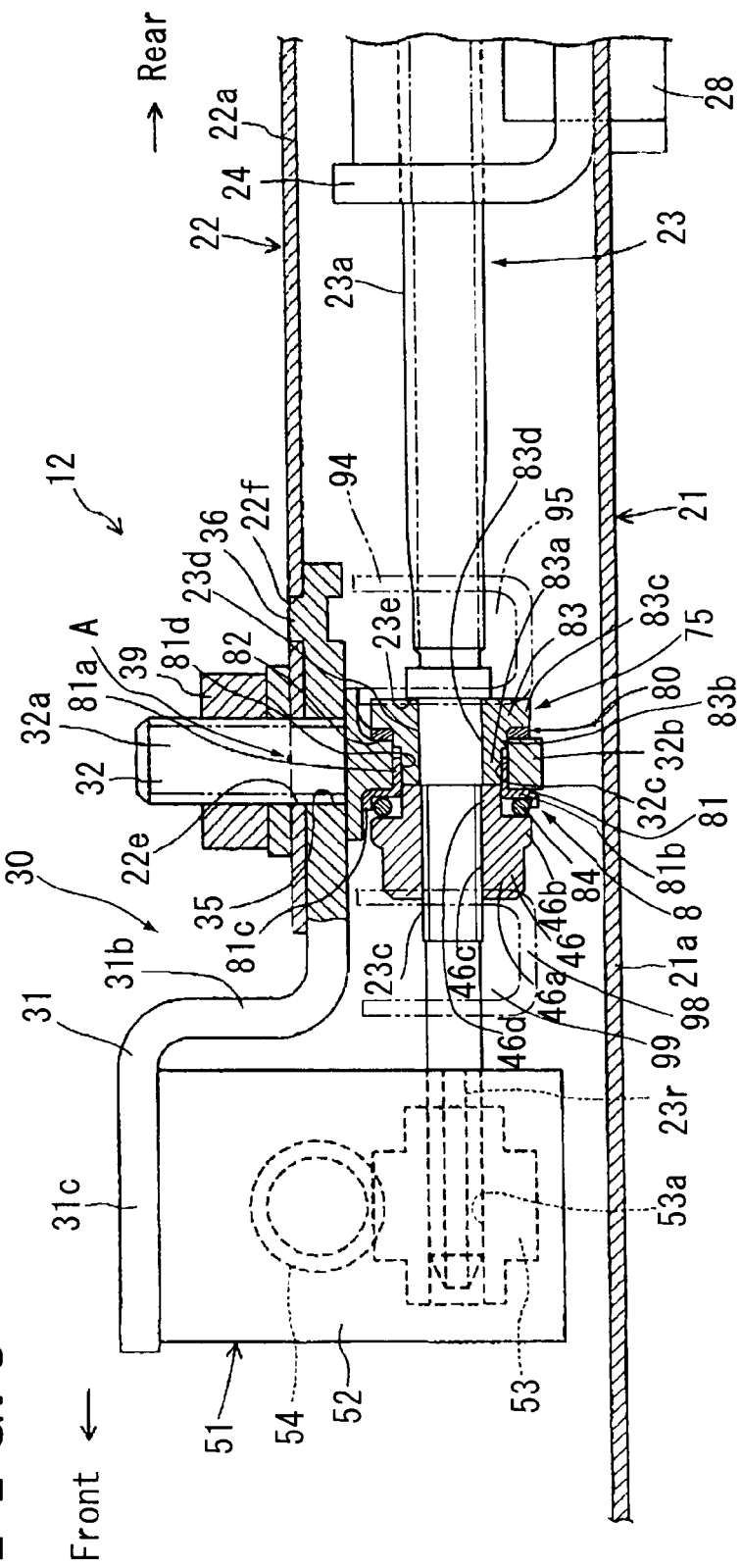
FIG. 5 is an enlarged view of a main portion of the power seat slide apparatus shown in FIG. 4.

As illustrated in FIGS. 4 and 5, the screw shafts 23 are arranged between the lower rail 21 and the upper rail 22 provided at the left side of the seat 10 and between the lower rail 21 and the upper rail 22 provided at the right side of the seat 10 respectively. Each of the screw shafts 23 is arranged in such a manner that an axial center of the screw shaft 23 extends in the vehicle longitudinal direction. As illustrated in FIG. 5, each of the screw shafts 23 includes a rear threaded portion 23a (lead screw) and a front threaded portion 23c. The rear threaded portion 23a is formed at a rear side and threaded in a forward direction while the front threaded portion 23c is formed at a front side relative to the rear threaded portion 23a and threaded in an opposite direction from the direction where the rear threaded portion 23a is threaded. At this time, the front threaded portion 23c may be threaded in the same direction as the rear threaded portion 23a.

The rear threaded portion 23a is a feed screw portion with which the feed nut member 24 is meshed. The feed nut member 24 is fixed to the lower rail 21 via a bolt 28. The front threaded portion 23c is a fastening screw portion where a fastening nut 46 (which will be explained later) is fastened and fixed. Further, a fitting portion 23d to which a fitting body 83 (which will be explained later) is fitted and a stepped portion 23e (a collar portion) with which a rear end surface of the fitting body 83 makes contact are formed on an outer periphery of the screw shaft 23.

A front end and a rear end of each of the screw shafts 23 are rotatably supported by the upper rail 22. Thus, when the screw shaft 23 rotates, the screw shaft 23 together with the upper rail 22 both slide relative to the lower rail 21 in the vehicle longitudinal direction. A support structure of each of the screw shafts 23 relative to each of the upper rails 22 and a detailed structure of the drive unit 25 will be explained below.

As illustrated in FIGS. 4 and 5, a first retention bracket 31 is fastened via a bolt 32 to a front end portion of each of the upper rails 22. In addition, a second retention bracket 33 is fastened via a bolt 34 to a rear end portion of each of the upper rails 22.

The first retention bracket 31 having a plate shape includes a bolt hole 35 at substantially a center and a positioning projection 36 at a rear end. A leg portion 32a of the bolt 32 is inserted into the bolt hole 35. A bolt hole 22e into which the leg portion 32a of the bolt 32 is inserted and a positioning hole 22f to which the positioning projection 36 is fitted are formed at the front end portion of the top wall 22a of the upper rail 22. In a state where the positioning projection 36 is fitted to the positioning hole 22f, the leg portion 32a of the bolt 32 is inserted into the bolt holes 35 and 22e of the first retention bracket 31 and the upper rail 22 respectively. Then, a nut 39 is screwed on the leg portion 32a of the bolt 32, thereby positioning and fixing the retention bracket 31 relative to the upper rail 22.

As illustrated in FIG. 5, the bolt 32 includes a support portion 32b that extends at a lower portion so as to be integrally fixed to the first retention bracket 31. The support portion 32b constitutes a portion of the first retention bracket 31. The support portion 32b may be integrally formed with the first retention bracket 31. The support portion 32b is provided between the first retention bracket 31 and the lower rail 21. A bearing hole 32c is formed at the support portion 32b so as to have a diameter slightly larger than that of the screw shaft 23. The screw shaft 23 is inserted into the bearing hole 32c via an disposed member 8 and a fitting member 75.

Figure 6:
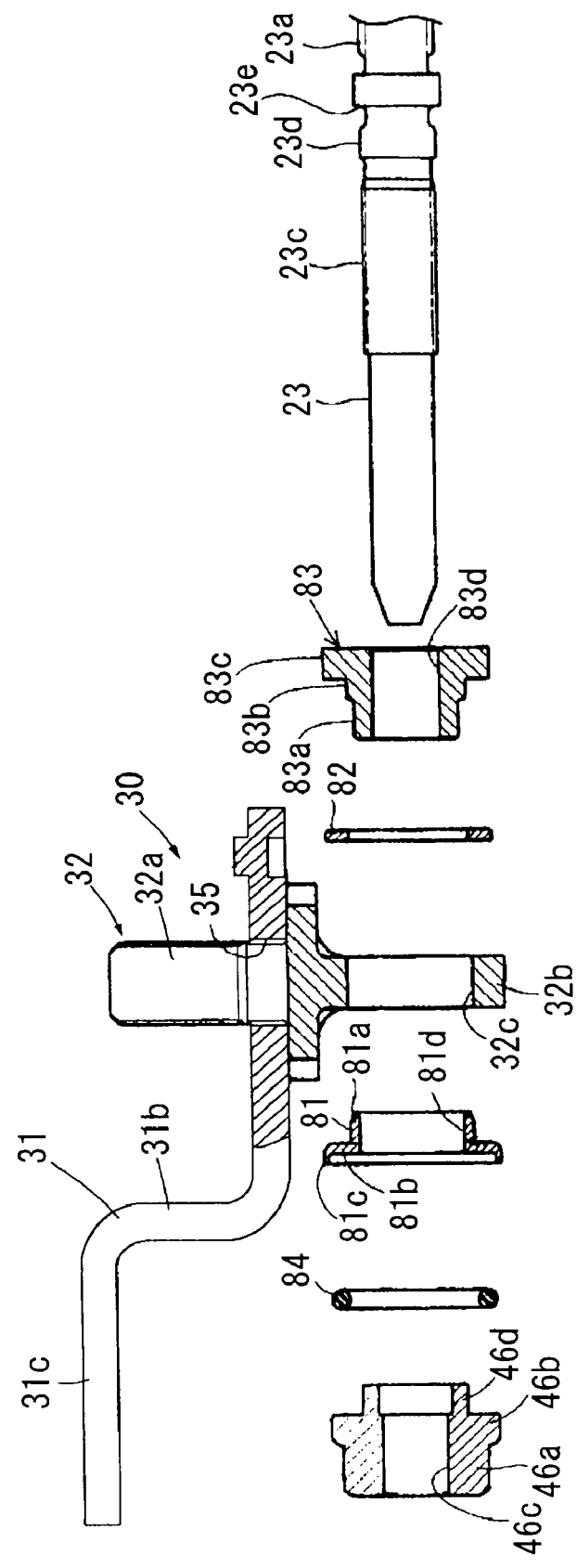
FIG. 6 is an exploded cross-sectional view of a main portion of the power seat slide apparatus according to the first embodiment.

As illustrated in FIGS. 5 and 6, the disposed member 8 includes a sliding disposed member 80 slidable to the support portion 32b of the bolt 32 and an annular member 84 having elasticity. The fitting member 75 fixed to the screw shaft 23 includes the fitting body 83 and the fastening nut 46.

The fitting body 83 constituting a portion of the fitting member 75 is made of metal. Specifically, the fitting body 83 includes a leg portion 83a, an intermediate portion 83b, a flange portion 83c, and a shaft bore 83d. The leg portion 83a extends in a thrust direction (i.e., an axial direction) of the screw shaft 23. The intermediate portion 83b is arranged in the rear of the leg portion 83a so as to have an outer diameter slightly larger than that of the leg portion 83a. The flange portion 83c is arranged in the rear of the intermediate portion 83b and also the support portion 32b of the bolt 32 so as to have an outer diameter larger than that of the intermediate portion 83b into a flanged shape. The shaft bore 83d penetrates through the leg portion 83a, the intermediate portion 83b, and the flange portion 83c and into which the fitting portion 23d of the screw shaft 23 is disposed. A front disposed member 81 is disposed between an outer periphery of the leg portion 83a of the fitting body 83 and the bearing hole 32c of the bolt 32. An outer periphery of the intermediate portion 83b is slidably in contact with a rear portion of an inner periphery of the bearing hole 32c. A rear disposed member 82 is disposed between a front end surface of the flange portion 83c and a rear end surface of the support portion 32b. A rear opening edge of the shaft bore 83d engages with the stepped portion 23e formed at the screw shaft 23.

The fastening nut 46 is arranged on an opposite side, i.e., the front side, of the rear disposed member 82 relative to the bolt 32. The fastening nut 46 constituting a portion of the fitting member 75 includes a leg portion 46a, a flange portion 46b, a projecting end portion 46d, and a female threaded portion 46c. The leg portion 46a extends in the axial direction of the screw shaft 23. The flange portion 46b is arranged in the rear of the leg portion 46a and in the front of the support portion 32b of the bolt 32. The flange portion 46b has an outer diameter larger than that of the leg portion 46a. The projecting end portion 46d extends in the rear of the flange portion 46b so as to have an outer diameter smaller than that of the flange portion 46b. The female threaded portion 46c penetrates through the leg portion 46a, the flange portion 46b, and the projecting end portion 46d in the axial direction so as to be meshed with the front threaded portion 23c of the screw shaft 23. An outer periphery of the projecting end portion 46d of the fastening nut 46 is coplanar with the outer periphery of the leg portion 83a of the fitting body 83. A rear end surface of the fastening nut 46 is in contact with a front end surface of the fitting body 83.

The sliding disposed member 80 includes the front disposed member 81 and the rear disposed member 82. The front disposed member 81 is formed by a radial and thrust member and made of metal. The front disposed member 81 includes a cylindrical portion 81a (radial portion), a flange portion 81b (thrust portion), and a hole portion 81d. The cylindrical portion 81a includes a radial sliding surface at an outer periphery. The flange portion 81b projects in a radially outward direction from the cylindrical portion 81a and includes a thrust sliding surface at a rear end. An outer diameter of the flange portion 81b is larger than that of the cylindrical portion 81a. The hole portion 81d penetrates through the cylindrical portion 81a and the flange portion 81b. The cylindrical portion 81a is arranged over a range from the outer periphery of the projecting end portion 46d of the fastening nut 46 to the outer periphery of the leg portion 83a of the fitting body 83. An outer peripheral surface of the cylindrical portion 81a, i.e., a surface not in contact with the outer periphery of the fastening nut 46 or the projecting end portion 46d, faces an inner periphery of the bearing hole 32c. The elastic annular member 84 is disposed between a front end surface of the flange portion 81b and a rear end surface of the flange portion 46b of the fastening nut 46. The elastic annular member 84 is formed by a ring body having a circular shape in a cross section. Specifically, the elastic annular member 84 is made of an elastic material such as rubber and silicon so as to have elasticity in the thrust direction. An annular support portion 81c is formed, bending forward, at an outer periphery of the flange portion 81b so as to support an outer peripheral portion of the annular member 84. The annular support portion 81c prevents the elastic annular member 84 from projecting radially outwardly. The rear end surface (i.e., the thrust sliding surface) of the flange portion 81b of the front disposed member 81 is pressed against a front end surface of the support portion 32b by means of an elastic force of the elastic annular member 84 in the thrust direction. Accordingly, the support portion 32b presses, via a rear end surface thereof, the rear disposed member 82 towards the flange portion 83c of the fitting body 83.

The fastening nut 46 elastically presses the fitting body 83 to the stepped portion 23e of the screw shaft 23 in the thrust direction by means of the fastening force to the front threaded portion 23c of the screw shaft 23 and the elastic force of the elastic annular member 84. Errors such as a dimensional error and an assembly error of the screw shaft 23 and the front disposed member 81 are absorbed by the elastic annular member 84.

The fitting portion 23d of the screw shaft 23 faces the inner periphery of the bearing hole 32c of the bolt 32 via the fitting body 83. The fitting portion 23d constantly receives a load such as a seat weight from the bolt 32 via the fitting body 83. In a case where a thread is formed at the fitting portion 23d, the thread may be damaged because of the application of the load. Thus, the fitting portion 23d of the screw shaft 23 and a facing inner periphery of the shaft bore 83d of the fitting body 83 are not formed by the thread.

A front end of the first retention bracket 31 is bent substantially vertically upward in the front of the upper rail 22 to form a vertical bent portion 31b. An upper end of the vertical bent portion 31b is further bent forward at a right angle to form a horizontal retention portion 31c that extends horizontally forward. A gearbox 51 is fixed to a lower surface of the horizontal retention portion 31c by means of an appropriate fastening member such as a bolt.

The second retention bracket 33 is formed into an L-shape as illustrated in FIG. 4. The second retention bracket 33 includes a horizontal portion 33a and a vertical portion 33b. A bolt hole 33c into which the bolt 34 is inserted is formed at the horizontal portion 33a. A bolt hole 22g into which the bolt 34 is also inserted is formed at the rear end portion of the upper rail 22 on which the second retention bracket 33 is mounted. The bolt 34 is inserted into the bolt holes 33c and 22g of the second retention bracket 33 and the upper rail 22, and then a nut 47 is screwed on the bolt 34 so that the second retention bracket 33 is integrally mounted on the upper rail 22.

A through-hole 48 into which the screw shaft 23 is inserted is formed at the vertical portion 33b of the second retention bracket 33. A bush 79 formed into a recess shape in a cross section is attached to the through-hole 48. A rear end shaft portion of the screw shaft 23 is rotatably supported by the bush 79. Accordingly, the screw shaft 23 that is meshed with the feed nut member 24 is rotatably supported by two portions, i.e., by the front disposed member 81 and the bush 79 provided at front and rear portions of the screw shaft 23, respectively.

The gear box 51 fixed at a front end of the lower surface of the first retention bracket 31 includes a housing 52. As illustrated in FIG. 5, a worm wheel 53 serving as an output rotation member is rotatably supported to be coaxial with the screw shaft 23. A spline hole 53a is formed at a rotational center of the worm wheel 53. Then, a spline engagement portion 23r formed at the front end of the screw shaft 23 spline engages with the spline hole 53a. Further, a worm shaft 54 including a worm that is meshed with the worm wheel 53 is supported by the housing 52 to be rotatable about an axis perpendicular to an axis of the worm wheel 53, i.e., rotatable about a horizontal axis perpendicular to the vehicle longitudinal direction. The worm wheel 53 and the worm shaft 54 constitute a speed reduction mechanism.

As illustrated in FIG. 2, a rotation transmitting shaft 55 is arranged between the gear boxes 51 provided at the left and right screw shafts 23 (left and right gear boxes 51) so as to extend in the width direction of the vehicle (i.e., left and right direction). As illustrated in FIGS. 2 and 5, one end of the rotation transmitting shaft 55 is connected to the worm shaft 54 supported by the left gear box 51 while the other end of the rotation transmitting shaft 55 is connected to the worm shaft 54 supported by the right gear box 51. An output shaft of an electric motor 57 is rotatably connected to the rotation transmitting shaft 55 by means of a gear mechanism. The motor 57, the rotation transmitting shaft 55 and the speed reduction mechanism (the worm shaft 54 and the worm wheel 53) constitute the drive unit 25. A retention member 30 fixed to the upper rail 22 and rotatably supporting the fitting member 75 that is fixed to the screw shaft 23 is constituted by the first retention bracket 31 and the bolt 32.

Next, cut-and-lifted portions 60, 61, 66, and 67 formed at the left and right longitudinal walls 22b of each of the upper rails 22 will be explained. The cut-and-lifted portions 60, 61, 66, and 67 are provided so as to distribute the load applied to the screw shaft 23 in a direction where the screw shaft 23 extends, by making contact with the fitting member 75.

As illustrated in FIGS. 4 and 5, bent grooves 94 each having a predetermined groove width and a substantially U-shape are formed at the left and right longitudinal walls 22b, respectively. Specifically, one bent groove 94 is formed at the left longitudinal wall 22b while the other bent groove 94 is formed at the right longitudinal wall 22b. The bent grooves 94 are arranged so as to face a rear end surface of the fitting member 75. Consequently, a rear end surface of the fitting body 83 that constitutes a portion of the fitting member 75 and respective front end surfaces of the cut-and-lifted portions 60 and 61 (serving as first and second cut-and-lifted portions) are arranged so as to have a small clearance (i.e., a predetermined clearance) therebetween by means of the bent grooves 94. The cut-and-lifted portions 60 and 61 are formed by bending inner portions 95, arranged at inner sides of the respective bent grooves 94, at bent portions 60a and 61a respectively (see FIG. 7).

Further, bent grooves 98 each having a predetermined groove width and a substantially U-shape is formed at the left and right longitudinal walls 22b, respectively. Specifically, one bent groove 98 is formed at the left longitudinal wall 22b while the other bent groove 98 is formed at the right longitudinal wall 22b. The bent grooves 98 are arranged so as to face a front end surface of the fitting member 75. Consequently, a front end surface of the fastening nut 46 that constitutes a portion of the fitting member 75 and respective rear end surfaces of the cut-and-lifted portions 66 and 67 (serving as the first and second cut-and-lifted portions) are arranged so as to have the small clearance therebetween by means of the bent grooves 98. The cut-and-lifted portions 66 and 67 are formed by bending inner portions 99, arranged at inner sides of the respective bent grooves 98, at bent portions 66a and 67a respectively (see FIG. 7).

Figure 7:
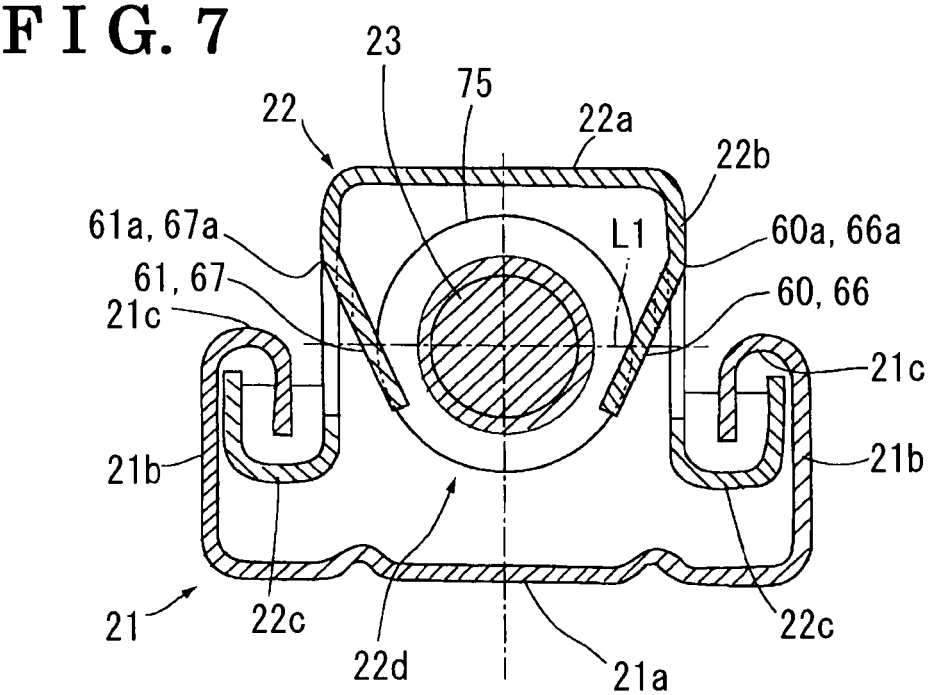
FIG. 7 is a cross-sectional view taken along a line 7-7 shown in FIG. 4.

Specifically, as illustrated in FIG. 7, the cut-and-lifted portions 60 and 61 are formed by bending the inner portions 95 provided at the inner sides of the respective bent grooves 94 at predetermined angles towards the opening portion 22d that opens to a lower side of the upper rail 22 at the bent portions 60a and 61a, respectively. In the same way, the cut-and-lifted portions 66 and 67 are formed by bending the inner portions 99 provided at the inner sides of the respective bent grooves 98 at predetermined angles towards the opening portion 22d that opens to a lower side of the upper rail 22 at the bent portions 66a and 67a, respectively. The cut-and-lifted portions 60 and 61, and/or the cut-and-lifted portions 66 and 67 are provided so that, when the excessively large load is applied to the seat 10, specifically, the upper rail 22 and the screw shaft 23 fixed to the seat 10, the respective front end surfaces of the cut-and-lifted portions 60 and 61 make contact with the rear end surface of the fitting member 75 fixed to the screw shaft 23 or the respective rear end surfaces of the cut-and-lifted portions 66 and 67 make contact with the front end surface of the fitting member 75 to thereby restrict the upper rail 22 from moving and distributing the excessive load to the upper rail 22. The cut-and-lifted portions 60, 61, 66, and 67 may be bent and formed before the seat 10 is assembled on the upper rails 22.

The front end surfaces of the cut-and-lifted portions 60 and 61 are formed so as to make contact with the rear end surface of the fitting member 75 below a horizontal plane L1 that passes through the rotational axis of the screw shaft 23. In addition, the rear end surfaces of the cut-and-lifted portions 66 and 67 are formed so as to make contact with the front end surface of the fitting member 75 below the horizontal plane L1. At this time, the bent portions 60a, 61a, 66a, and 67a of the cut-and-lifted portions 60, 61, 66, and 67 are arranged above respective upper ends of the left and right flange walls 21c or the left and right side walls 21b of the lower rail 21.

Next, an operation of the seat 10 according to the first embodiment will be explained below. In order to move the seat 10 forward or rearward, a switch for forward movement or rear movement provided in the vicinity of the seat 10 is operated, for example, so as to actuate the motor 57 in a forward direction or a rearward direction. Accordingly, the rotation transmitting shaft 55 is driven to rotate in the forward direction or the rearward direction. The rotation of the rotation transmitting shaft 55 is transmitted to the worm shafts 54 provided within the respective gear boxes 51 connected to respective ends of the rotation transmitting shaft 55. Rotations of the worm shafts 54 cause the respective worm wheels 53, each serving as the output rotation member, to rotate. The resulting rotations of the worm wheels 53 are transmitted to the respective screw shafts 23 via the spline engagement portions 23r. Consequently, the rotation of the rotation transmitting shaft 55 by the motor 57 achieves synchronous low speed rotations of the left and right screw shafts 23 via the speed reduction mechanisms constituted by the worm shafts 54 and the worm wheels 53.

When each of the left and right screw shafts 23 rotates, the fitting member 75 fixed to each of the screw shafts 23 and the disposed member 8 rotate together with the screw shaft 23. Accordingly, the fitting member 75 and the disposed member 8 in addition to the screw shaft 23 slidably rotate relative to the support portion 32b of the bolt 32.

Because the feed nut member 24 fixed to each of the lower rails 21 is meshed with each of the screw shafts 23, the screw shaft 23 rotates and moves in the axial direction thereof relative to the feed nut member 24. Thus, each of the upper rails 22 moves forward or rearward via the retention member 30 that rotatably supports the screw shaft 23 and the second retention bracket 33 to thereby adjust the position of the seat 10.

Next, a case where the switch for moving the seat 10 in the rearward direction so as to actuate the motor 57 to rotate in the forward direction or the rearward direction in the aforementioned operation, for example, and where the seat 10 cannot move because of a pinch of a foreign matter, and the like will be explained.

In such case, each of the screw shafts 23 attempts to rotate and move in the axially rearward direction relative to the feed nut member 24. However, because the seat 10, specifically, the upper rail 22 fixed to the seat 10 cannot move, the screw shaft 23 causes the rear end surface of the flange portion 46b of the tightening nut 46 to excessively compress the elastic annular member 84. Then, the screw shaft 23 attempts to move rearward relative to the upper rail 22 while a large load is being input to the screw shaft 23. At this time, the support portion 32*b* of the bolt 32 that constitutes a portion of the retention member 30 receives a load in the rearward direction via the elastic annular member 84 and the flange portion 81*b* of the front disposed member 81. Thus, a rotational force is generated in the bolt 32 about a point A (see FIG. 5) serving as a support point that is an intersection between an axial center of the leg portion 32*a* of the bolt 32 and an upper surface of the upper rail 22. Then, if the screw shaft 23 continues to rotate, the annular member 84 and the bolt 32 may be damaged.

In such case, however, according to the first embodiment, the respective font end surfaces of the cut-and-lifted portions 60 and 61 formed at the left and right longitudinal walls 22*b* are arranged, each having the predetermined clearance relative to the rear end surface of the fitting body 83 that constitutes a portion of the fitting member 75. Thus, at a time the screw shaft 23 moves by a distance corresponding to the predetermined clearance, the front end surfaces of the cut-and-lifted portions 60 and 61 make contact with the rear end surface of the fitting body 83 so that the cut-and-lifted portions 60 and 61 distribute the load to the upper rail 22. As a result, the movement of the screw shaft 23 in the rearward direction is stably restricted.

In addition, in a case where the switch for moving the seat 10 in the forward direction is operated and where the seat 10 cannot move because of a pinch of a foreign matter and the like, the respective rear end surfaces of the cut-and-lifted portions 66 and 67 formed at the left and right longitudinal walls 22*b* are arranged, each having the predetermined clearance with the front end surface of the fastening nut 46 that constitutes a portion of the fitting member 75. Thus, at a time the screw shaft 23 moves by a distance corresponding to the predetermined clearance, the rear end surfaces of the cut-and-lifted portions 66 and 67 make contact with the front end surface of the fastening nut 46 so that the cut-and-lifted portions 66 and 67 distribute the load to the upper rail 22. As a result, the movement of the screw shaft 23 in the forward direction is stably restricted.

Further, as illustrated in FIG. 7, the cut-and-lifted portions 60 and 61 are arranged to make contact with the rear end surface of the fitting member 75 (specifically, the fitting body 83) at a position away from the axial center of the screw shaft 23 relative to a connected portion between the upper rail 22 and the retention member 30, i.e., at a position below the axial center of the screw shaft 23. In the same manner, the cut-and-lifted portions 66 and 67 are arranged to make contact with the front end surface of the fitting member 75 (specifically, the fastening nut 46) at a position away from the axial center of the screw shaft 23 relative to the connected portion between the upper rail 22 and the retention member 30, i.e., at a position below the axial center of the screw shaft 23. Accordingly, at a time the screw shaft 23 moves forward or rearward by a distance corresponding to the predetermined clearance, the front end surfaces of the cut-and-lifted portions 60 and 61 or the rear end surfaces of the cut-and-lifted portions 66 and 67 make contact with the rear end surface or the front end surface of the fitting member 75 at a position away from the point A so as to receive the load while the bolt 32 attempts to rotate forward or rearward about the point A serving as the support point. As a result, the movement of the screw shaft 23 is further stably restricted.

Not only in the aforementioned case where the seat 10 cannot move because of a pinch of a foreign matter and the like but also in a case of a vehicle collision, the aforementioned effect is obtainable. That is, when the vehicle collides with an object at a front side, the movements of the vehicle body and the lower rails 21 fixed to the vehicle body are rapidly stopped. However, the passenger, the seat 10 on which the passenger is seated, and the upper rails 22 to which the seat 10 is fixed attempt to continue to move forward by mean of inertia force. At this time, the front end surface of the support portion 32*b* of the bolt 32 that is fixed to each of the upper rails 22 attempts to move forward while pressing and compressing the elastic annular member 84 via the flange portion 81*b* of the front disposed member 81. In such case, however, according to the first embodiment, the cut-and-lifted portions 60 and 61 formed at the left and right longitudinal walls 22*b* are arranged in the vicinity of a rear of the rear end surface of the fitting body 83 that constitutes a portion of the fitting member 75. When each of the upper rails 22 moves forward by the distance corresponding to the predetermined clearance, the respective front end surfaces of the cut-and-lifted portions 60 and 61 make contact with the rear end surface of the fitting body 83 so that the load is distributed to the upper rail 22. The forward movement of the upper rail 22 is restricted accordingly. The elastic annular member 84 and the bolt 32 are prevented from being damaged.

In a case of a vehicle collision at a rear side, the respective rear end surfaces of the cut-and-lifted portions 66 and 67 make contact with the front end surface of the fitting member 75 so that the load applied to the screw shaft 23 is distributed to the upper rail 22.

According to the first embodiment, the cut-and-lifted portions 60, 61, 66 and 67 are formed by bending the portions of the left and right longitudinal walls 22*b*. Thus, without an addition of a new component, the load applied to each of the screw shafts 23 is distributed to each of the upper rails 22 by the respective front end surfaces of the cut-and-lifted portions 60 and 61 to make contact with the rear end surface of the fitting member 75 or the respective rear end surfaces of the cut-and-lifted portions 66 and 67 to make contact with the front end surface of the fitting member 75. The retention member 30 is protected by a simple structure to thereby achieve a reduced cost while reliability is improved.

In addition, according to the first embodiment, the cut-and-lifted portions 60 and 61 are arranged close to the rear end surface of the fitting member 75. Thus, even in a case where the vehicle collides with an object at a front side and thus a collision impact is relatively large to thereby cause the seat 10 and the upper rails 22 fixed to the seat 10 to continue moving forward by means of inertia force, the respective front end surfaces of the cut-and-lifted portions 60 and 61 make contact with the rear end surface of the fitting member 75. Thus, the load applied to the screw shaft 23 is distributed to the upper rail 22 to thereby stably restrict the forward movement of the seat 10. The retention member 30 that holds the screw shaft 23 is protected and reliability is enhanced. The cut-and-lifted portions 60 and 61 are initially formed at predetermined positions of the left and right longitudinal walls 22*b* and are bent and formed after the seat 10 is assembled on the upper rails 22. Thus, a reduction of assembly hours is achieved.

Further, according to the first embodiment, the cut-and-lifted portions 60 and 61 are arranged to make contact with the rear end surface of the fitting member 75 at a position away from the axial center of the screw shaft 23 relative to the connected portion between the upper rail 22 and the retention member 30, i.e., at a position below the horizontal plane L1 that passes through the rotational axis of the screw shaft 23. In the same manner, the cut-and-lifted portions 66 and 67 are arranged to make contact with the front end surface of the fitting member 75 at a position away from the axial center of the screw shaft 23 relative to the connected portion between the upper rail 22 and the retention member 30, i.e., at a position below the horizontal plane L1. Thus, even when the large load is applied to the screw shaft 23 in the axial direction thereof, the cut-and-lifted portions 60 and 61 or the cut-and-lifted portions 66 and 67 stably receive the load in a balanced manner, thereby enhancing the reliability.

Furthermore, according to the first embodiment, the bent portions 60a, 61a, 66a, and 67a of the cut-and-lifted portions 60, 61, 66 and 67, respectively, are arranged above the respective upper ends of the left and right flange walls 21c or the left and right side walls 21b. Thus, a working space is ensured for bending and forming the cut-and-lifted portions 60, 61, 66 and 67 after the seat 10 is assembled on the upper rails 22. As a result, the bent grooves 94 and 98 are formed at the longitudinal walls 22b beforehand, and the cut-and-lifted portions 60, 61, 66, and 67 are bent and formed after the seat 10 is assembled on the upper rail 22, thereby enhancing the assembly performance.

According to the first embodiment, the elastic annular member 84 and the front disposed member 81 that holds the elastic annular member 84 are arranged at a front side of the support portion 32b while the rear disposed member 82 constituted by a flat washer is arranged at a rear side of the support portion 32b. Alternatively, the elastic annular member 84 and the front disposed member 81 may be arranged at the rear side of the support portion 32b while the rear disposed member 82 may be arranged at the front side of the support portion 32b. In addition, the annular member 84 and the front disposed member 81 may also be arranged at the rear side of the support portion 32b in addition to the front side thereof. At this time, the rear disposed member 82 may be omitted. In such case, in order to distribute the large load applied to the screw shaft 23 in the axial direction thereof to the upper rail 22, the cut-and-lifted portions formed at the left and right longitudinal walls 22b are arranged at the front side, or both the front and rear sides of the support portion 32b. Then, the cut-and-lifted portions may make contact with the front end surface or the rear end surface of the fitting member 75.

Figure 8:
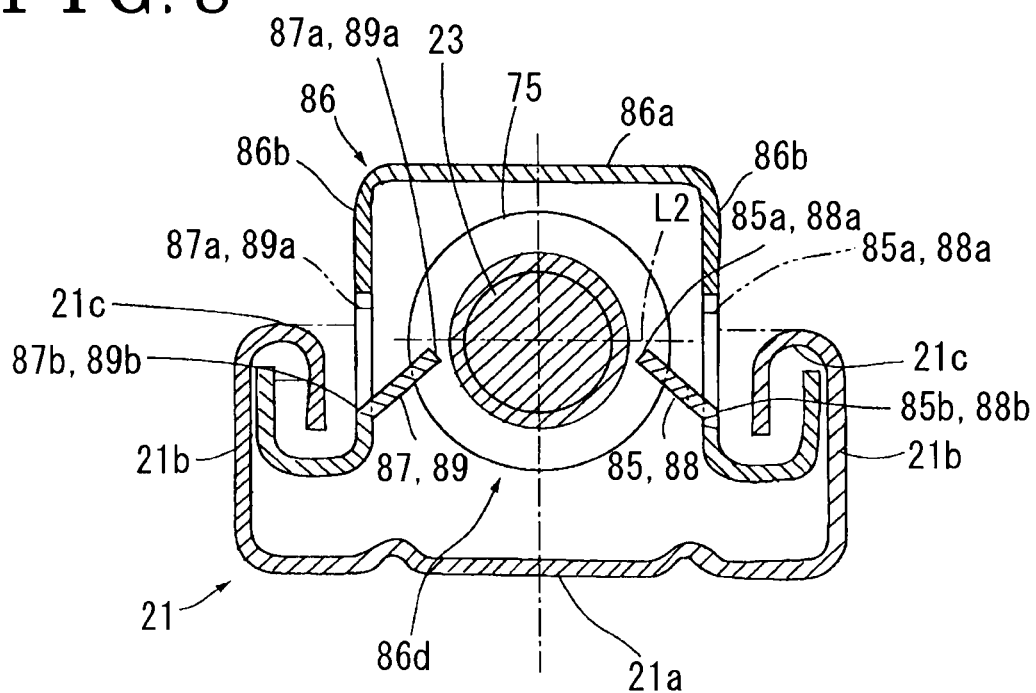
FIG. 8 is an enlarged cross-sectional view of cut-and-lifted portions formed at an upper rail according to a second embodiment.

A second embodiment will be explained with reference to FIG. 8. As illustrated in FIG. 8, cut-and-lifted portions 85, 87, 88 and 89 formed at left and right longitudinal walls 86b of each upper rail 86 are arranged so that bent grooves corresponding to the bent grooves 94 and 98 according to the first embodiment are each formed into a substantially inverse U-shape. The cut-and-lifted portions 85, 87, 88 and 89 provided for distributing the load applied to the screw shaft 23 in the axial direction thereof by making contact with the rear end surface or the front end surface of the fitting member 75 are achieved by bending inner portions provided inside of the bent grooves formed at the left and right longitudinal walls 22b of the upper rail 2 at bent portions 85b, 87b, 88b and 89b.

According to the second embodiment, end portions 85a, 87a, 88a and 89a of the cut-and-lifted portions 85, 87, 88 and 89, respectively, obtained before bending are arranged above upper ends of the left and right flange walls 21c or the left and right side walls 21b of each of the lower rails 21. Thus, a working space is ensured for bending and forming the cut-and-lifted portions 85, 87, 88 and 89 after the seat 10 is assembled on the upper rails 86. The bent grooves each having a predetermined groove width and formed into the substantially inverse U-shape are formed at the left and right longitudinal walls 86b of the upper rail 86 beforehand, and then the cut-and-lifted portions 85, 87, 88 and 89 are obtained by bending the inner portions provided inside of the bent grooves after the seat 10 is assembled on the upper rails 86.

The cut-and-lifted portions 85, 87, 88 and 89 may be bent and formed before the seat 10 is assembled on the upper rail 86.

Respective front end surfaces of the cut-and-lifted portions 85 and 87 (serving as the first and second cut-and-lifted portions) make contact with the rear end surface of the fitting member 75 and respective rear end surfaces of the cut-and-lifted portions 88 and 89 (serving as the first and second cut-and-lifted portions) make contact with the front end surface of the fitting member 75 at a position below a horizontal plane L2 that passes through the rotational axis of the screw shaft 23. Accordingly, when the large load is applied to the screw shaft 23 in the axial direction thereof, the cut-and-lifted portions 85, 87, 88 and 89 stably receive the load in a balanced manner, thereby enhancing the reliability. According to the second embodiment, the other effects obtained according to the first embodiment are also obtained.

Figure 9:
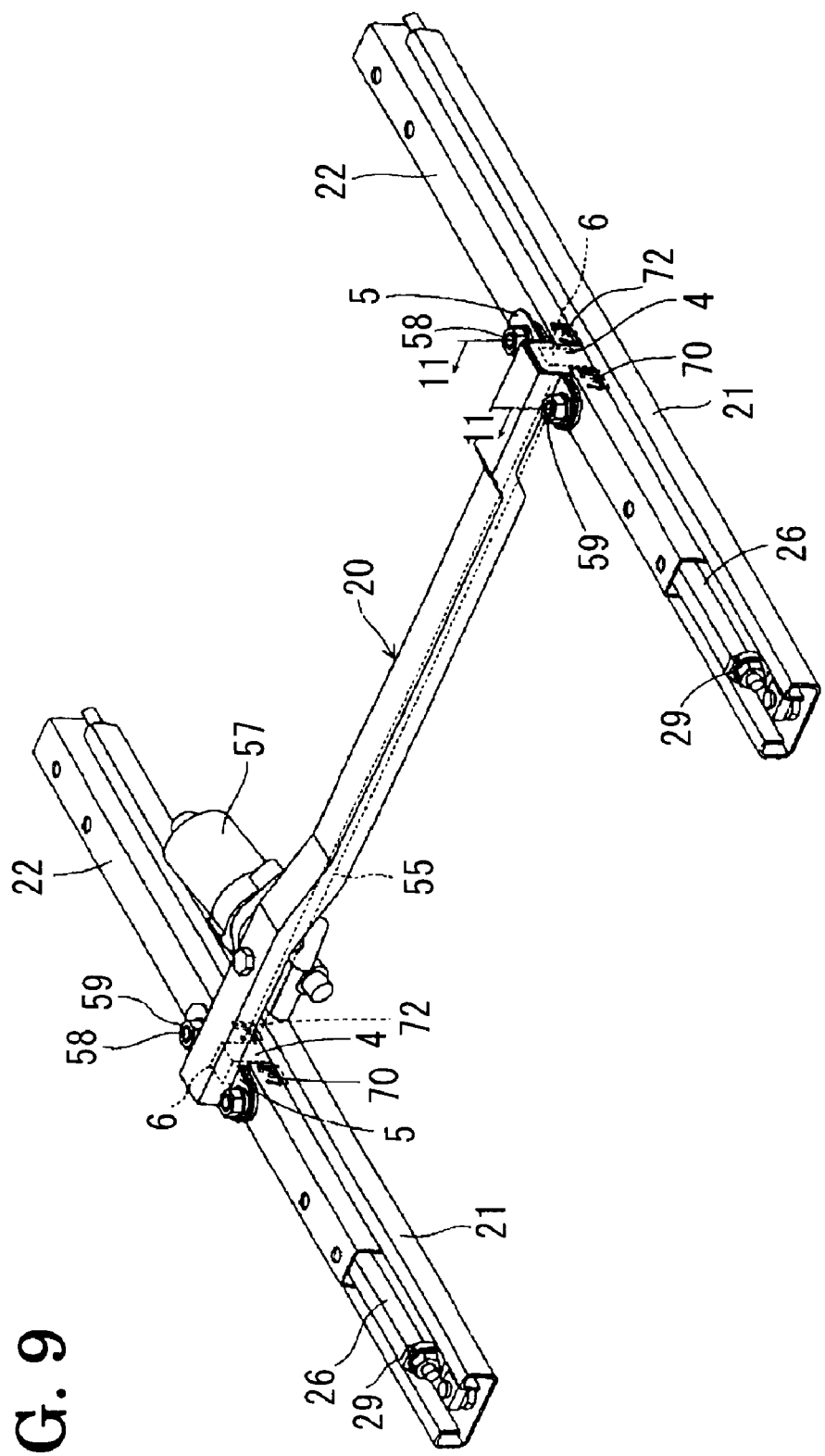
FIG. 9 is a perspective view of a power seat slide apparatus according to a third embodiment.
Figure 10:
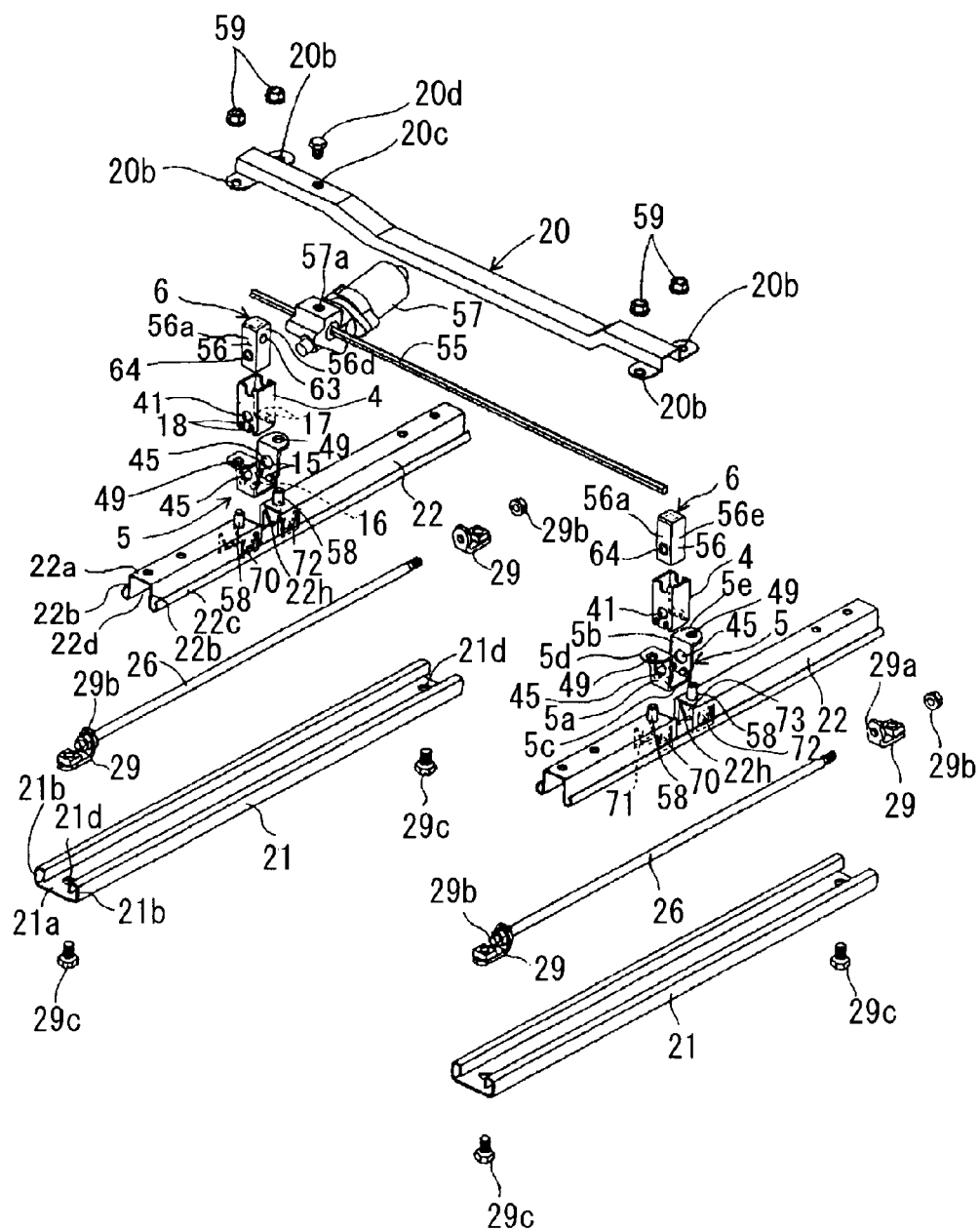
FIG. 10 is an exploded perspective view of the power seat slide apparatus according to the third embodiment.

A third embodiment will be explained with reference to FIGS. 9 to 12. As illustrated in FIGS. 9 and 10, support members 6 each including a drive nut 65 (see FIG. 11) serving as a feed nut member and driven by the motor 57 to rotate are provided instead of the feed nut members 24 that are provided in the first embodiment. When each of the drive nuts 65 is driven by the motor 57 to rotate, each of the support members 6 moves in the axially forward and rearward direction relative to a screw shaft 26 serving as the screw member. The support member 6 also includes a gear box 56 to which an elastic case 4 is press-fitted from an outer side. The support member 6 and the elastic case 4 are held by a retention bracket 5. The retention bracket 5 is provided at each of the upper rails 22 and the screw shaft 26 is fixed to each of the lower rails 21. The aforementioned structure is different from the first embodiment. The substantially same components of the third embodiment as those of the first embodiment bear the same reference numerals and explanations thereof will be omitted. In addition, explanation of the same operations of the third embodiment as those of the first embodiment will be omitted and differences will only be described below.

Each of the retention brackets 5 is accommodated in a recess portion 22h formed at a substantially longitudinally center portion of the top wall 22a and the longitudinal walls 22b of each of the upper rails 22. Bolts 58 are inserted into bolt holes 22j formed in the vicinity of the recess portion 22h of the upper rail 22, bolt holes 49 formed at flange walls 5d and 5e of the retention bracket 5, respectively, and bolt holes 20b formed at an end portion of a reinforcement bracket 20 and are tightened by respective nuts 59 to thereby fix the retention bracket 5 and the reinforcement bracket 20 to the upper rail 22.

Figure 11:
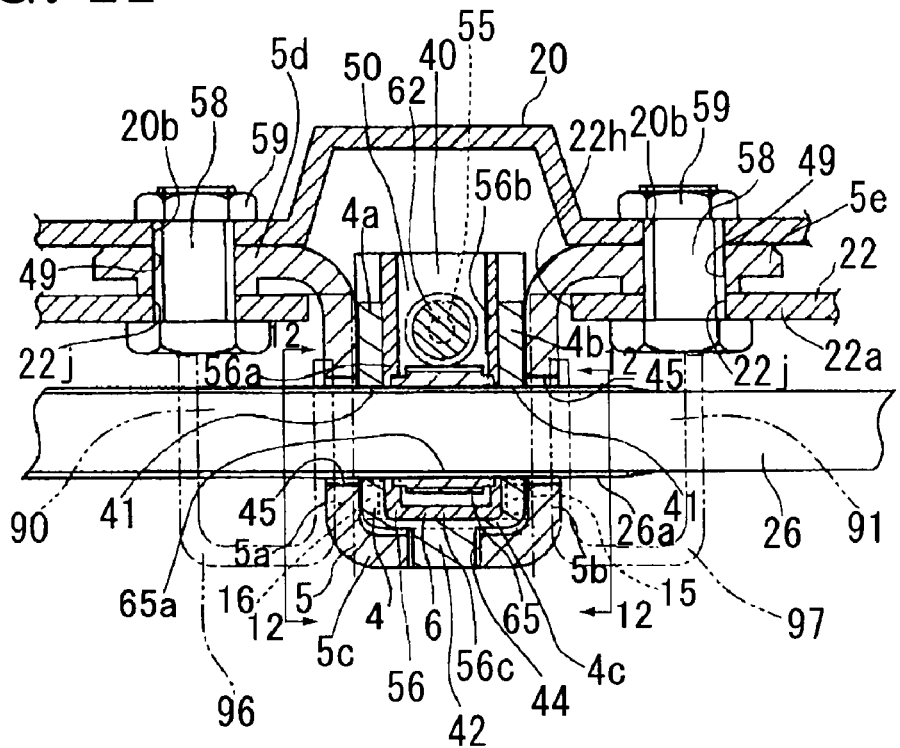
FIG. 11 is a cross-sectional view illustrating a retention bracket attached to an upper rail, an elastic case, a drive nut, and a screw shaft according to the third embodiment.
Figure 12:
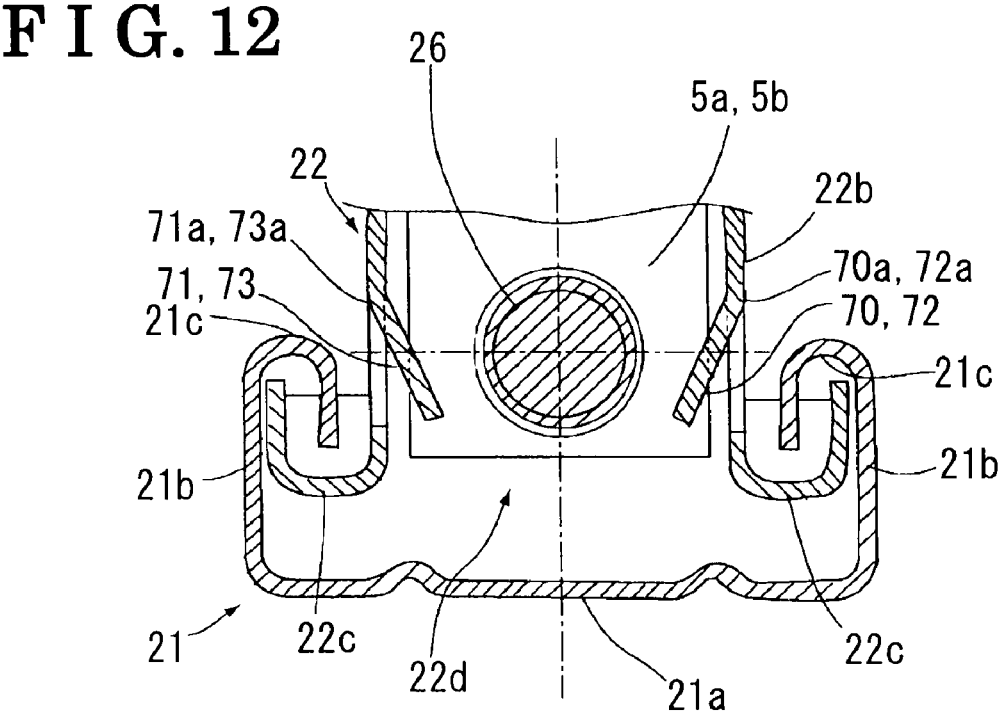
FIG. 12 is an enlarged cross-sectional view of cut-and-lifted portions formed at the upper rail according to the third embodiment.

As illustrated in FIGS. 10 and 11, each of the retention brackets 5 includes front and rear walls 5a and 5b, a void portion 50, a bottom wall 5c, and the flange walls 5d and 5e. The front and rear walls 5a and 5b are provided at axially front and rear sides of the screw shaft 26 so as to face each other. The void portion 50 is formed between the front and rear walls 5a and 5b and into which the elastic case 4 is disposed. The bottom wall 5c serves as a connection wall for connecting the front wall 5a and the rear wall 5b below the void portion 50. The flange walls 5d and 5e extend from the front and rear walls 5a and 5b, respectively, each bending into a flanged shape. Opening holes 45 into which the screw shaft 26 is inserted are formed at the front and rear walls 5a and 5b, respectively. Two projections 16 are formed at a lower portion of the front wall 5a. Each of the projections 16 has a predetermined length and extends towards the void portion 50 in a cylindrical shape, for example. In the same manner, two projections 15 are formed at a lower portion of the rear wall 5b. Each of the projections 15 has the predetermined length and extends towards the void portion 50 in a cylindrical shape, for example. The projections 15 and 16 serve as stoppers. In addition, the projections 16 are disposed into cut bores 18 formed at a front wall 4a of the elastic case 4 while the projections 15 are disposed into cut bores 17 formed at a rear wall 4b of the elastic case 4 under a condition that the elastic case 4 and the gear box 56 are press-fitted into the void portion 50 of the retention bracket 5. The projections 16 face a front wall 56a of the gear box 56 in such a manner that a predetermined clearance is formed between the front wall 56a and end surfaces of the respective projections 16 facing the void portion 50. In the same way, the projections 15 face a rear wall 56b of the gear box 56 in such a manner that a predetermined clearance is formed between the rear wall 56b and end surfaces of the respective projections 15 facing the void portion 50. A fitting hole 44 is formed at the bottom wall 5c so as to engage with a positioning protrusion 42 of the elastic case 4. The flange walls 5d and 5e are arranged above the top wall 22a of the upper rail 22.

Each of the support members 6 includes the gear box 56, the drive nut 65 and a worm shaft 62. The drive nut 65, which is accommodated within the gear box 56, includes a female thread 65a at an inner diameter portion (i.e., an inner periphery) meshed with a male thread 26a of the screw shaft 26. The worm shaft 62 is accommodated within the gear box 56 and meshed with a worm gear formed at an outer periphery of the drive nut 65. Both the worm shafts 62 provided within the respective gear boxes 56 are connected to the motor 57 via the rotation transmitting shaft 55 as in the same way as the first embodiment. The reinforcement bracket 20 is arranged above the rotation transmitting shaft 55. The motor 57 is fixed to the reinforcement bracket 20 by a bolt 20d inserted into an engagement bore 57a of the motor 57 and an attachment bore 20c of the reinforcement bracket 20.

The gear box 56, which is a metallic (for example, aluminum) rectangular solid, includes the front and rear walls 56a and 56b, a bottom wall 56c, and side walls 56d and 56e. The front and rear walls 56a and 56b are arranged to face each other in axially front and rear direction of the screw shaft 26. The side wall 56d facing inside of the seat 10 includes a through-hole 63 into which the rotation transmitting shaft 55 is inserted. Holes 64 into which the screw shaft 26 is inserted are formed at the front and rear walls 56a and 56b. The gear box 56 is formed by two divided portions. After the drive nut 65 and the worm shaft 62 are received, parting sections of the divided portions match each other by means of a bolt, and the like, so that the divided portions are integrally fixed to each other.

The support member 6 is press-fitted and fixed to a receiving portion 40 of the elastic case 4 that is formed into a box shape. The elastic case 4 is press-fitted to the void portion 50 of the retention bracket 5 to such an extent that a relative positional adjustment of the elastic case 4 to the retention bracket 5 is available.

The elastic case 4 made of an elastic material such as a rubber includes the front and rear walls 4a and 4b, side walls, and a bottom wall 4c. The front and rear walls 4a and 4b face each other, being arranged in axially front and rear direction. The side walls are arranged perpendicular to the axial direction of the screw shaft 26. In a state where the support member 6 is press-fitted to the receiving portion 40 of the elastic case 4, the front and rear walls 4a and 4b and the side walls of the elastic case 4, each serving as a pressure contact surface, make contact in a pressing manner with the front and rear walls 56a and 56b and the side walls 56d and 56e of the gear box 56, respectively, so that the elastic case 4 elastically retains the gear box 56. Retention holes 41 into which the screw shaft 26 is inserted are formed at the front and rear walls 4a and 4b of the elastic case 4. The two cut bores 18 are formed at a lower portion of the front wall 4a while the two cut bores 17 are formed at a lower portion of the rear wall 4b. Each of the cut bores 17 and 18 has a predetermined length and extends upwardly from the bottom wall 5c. The cut bores 17 and 18 are formed in such shapes that the projections 15 and 16, which serve as the stoppers and extend from the front and rear walls 5a and 5b towards the void portion 50 of the retention bracket 5, are prevented from interfering with the elastic case 4 when the elastic case 4 is press-fitted to the void portion 50 of the retention bracket 5. The positioning protrusion 42 is formed at the bottom wall 4c.

Axial font and rear ends of each of the screw shafts 26 are disposed into shaft holes 29a of fixed brackets 29, respectively, and tightened by respective nuts 29b so as to be fixed to the fixed brackets 29. The fixed brackets 29 are fixed to the bottom wall 21a of each of the lower rails 21 by means of tightening of bolts 29c.

Next, cut-and-lifted portions 70, 71, 72 and 73 formed at the left and right longitudinal walls 22b of each of the upper rails 22 so as to distribute a large load applied to the drive nut 65, serving as the feed nut member, in the axial direction of the screw shaft 26 will be explained below.

As illustrated in FIG. 11, bent grooves 96 each having a predetermined groove width and formed into a substantially U-shape are formed at the left and right longitudinal walls 22b of each of the upper rail 22, respectively. Specifically, one bent groove 96 is formed at the left longitudinal wall 22b while the other bent groove 96 is formed at the right longitudinal wall 22b. The two bent grooves 96 face each other and arranged, being adjacent to a front end surface of the retention bracket 5. In the same way, bent grooves 97 each having a predetermined groove width and formed into a substantially U-shape are also formed at the left and right longitudinal walls 22b of each of the upper rails 22, respectively. Specifically, one bent groove 97 is formed at the left longitudinal wall 22b while the other bent groove 97 is formed at the right longitudinal wall 22b. The two bent grooves 97 face each other and arranged, being adjacent to a rear end surface of the retention bracket 5. The bent grooves 96 are formed so that rear end surfaces of the cut-and-lifted portions 70 and 71 (serving as the first and second cut-and-lifted portions) formed by bending inner portions 90 of the bent grooves 96 at bent portions 70a and 71a, respectively, and a front end surface of the front wall 5a of the retention bracket 5 are arranged to have a small clearance (i.e., a predetermined clearance) therebetween. In addition, the bent grooves 97 are formed so that front end surfaces of the cut-and-lifted portions 72 and 73 (serving as the first and second cut-and-lifted portions) formed by bending inner portions 91 of the bent grooves 97 at bent portions 72a and 73a, respectively, and a rear end surface of the rear wall 5b of the retention bracket 5 are arranged to have the small distance therebetween.

In a case where an excessive load is applied in the rearward direction to the seat 10, specifically, to the upper rail 22 fixed to the seat 10 and the drive nut 65, the rear end surfaces of the cut-and-lifted portions 70 and 71 make contact with the front end surface of the front wall 5a of the retention bracket 5 to thereby distribute the load to the upper rail 22. In addition, in a case where an excessive load is applied in the forward direction to the seat 10, the front end surfaces of the cut-and-lifted portions 72 and 73 make contact with the rear end surface of the rear wall 5b of the retention bracket 5 to thereby distribute the load to the upper rail 22.

When the rear end surfaces of the cut-and-lifted portions 70 and 71 and the front end surfaces of the cut-and-lifted portions 72 and 73 make contact with the front end surface of the front wall 5a and the rear end surface of the rear wall 5b respectively, the respective contact surfaces are arranged at a position away from the axial center of the screw shaft 26 relative to a connected portion between the upper rail 22 and the retention bracket 5, i.e., at a position below the rotational axis of the screw shaft 26.

An operation according to the third embodiment will be explained. The switch for moving the seat 10 is operated to actuate the motor 57 to rotate in the forward direction or the rearward direction in the same manner as the first embodiment. Then, the rotation transmitting shaft 55 is driven to rotate in the forward or rearward direction. The rotation of the rotation transmitting shaft 55 is transmitted to the worm shafts 62 provided within the gear boxes 56 connected to the both ends of the rotation transmitting shaft 55. Each of the worm shafts 62 serving as the output rotation member is meshed with the worm gear formed at the outer periphery of the drive nut 65, thereby rotating the drive nut 65. The drive nut 65 rotates on the male thread 26a of the screw shaft 26 that is meshed with the female thread 65a formed at the inner diameter portion of the drive nut 65. Because each of the screw shafts 26 is fixed onto each of the lower rails 21, the drive nut 65 rotates and moves on the axial line of the screw shaft 26. Accordingly, each of the upper rails 22 moves forward or rearward by means of the gear box 56 constituting the support member 6 that supports the drive nut 65 to be rotatable, the elastic case 4 and the retention bracket 5, thereby adjusting the position of the seat 10.

Next, a case where the seat 10 cannot move rearward because of a pinch of a foreign matter, and the like will be explained. In such case, each of the drive nuts 65 attempts to move axially rearward while rotating relative to each of the screw shafts 26. However, the upper rails 22 fixed to the seat 10 and the retention brackets 5 fixed to the respective upper rails 22 cannot move. Even in such state, each of the drive nuts 65 receives a rotational force from the motor 57 and pushes the rear wall 4b of the elastic case 4 via the gear box 56 in the axially rearward direction of the screw shaft 26. Then, the drive nut 65 attempts to move further rearward while compressing the rear wall 4b of the elastic case 4 with the rear wall 5b of the retention bracket 5. However, because the projections 15 are formed at the rear wall 5b of the retention bracket 5, the respective end surfaces of the projections 15 make contact with the rear end surface of the gear box 56 at a time the drive nut 65 moves by a distance corresponding to the predetermined clearance. As a result, the drive nut 65 is restricted to compress the rear wall 4b of the elastic case 4, thereby avoiding the damage of the rear wall 4b. However, afterwards, it may be possible that the drive nut 65 may continue to press the rear wall 5b of the retention bracket 5 via the rear wall 56b of the gear box 56 and the projections 15 by receiving the drive force from the motor 57, which may lead to an excessive deformation of the retention bracket 5 in the rearward direction relative to a connected portion between the retention bracket 5 and the upper rail 22. However, because the cut-and-lifted portions 72 and 73 that are formed at the left and right longitudinal walls 22b are arranged in the vicinity of the rear end surface of the rear wall 5b of the retention bracket 5, the rear end surface of the rear wall 5b makes contact with the cut-and-lifted portions 72 and 73 at a time the rear wall 5b of the retention bracket 5 is elastically deformed by a predetermined level. Then, the load applied to the drive nut 65 is distributed to the upper rail 22 to thereby restrict the rearward movement of the drive nut 65. Accordingly, the retention bracket 5 is prevented from being damaged and the reliability is enhanced.

In addition, in a case where the seat 10 cannot move forward because of a pinch of a foreign matter, and the like, the load is also distributed to the upper rail 22 by the front end surface of the front wall 5a of the retention bracket 5 to make contact with the respective rear end surfaces of the cut-and-lifted portions 70 and 71 formed at the left and right longitudinal walls 22b, thereby restricting the forward movement of the drive nut 65.

Further, in a case of a vehicle collision at a front side so that a collision impact is relatively large, the aforementioned effect is also obtained. That is, when the vehicle collides with an object at a front side, the movements of the vehicle body and the lower rails 21 fixed to the vehicle body are rapidly stopped. However, the passenger, the seat 10 on which the passenger is seated, and the upper rails 22 to which the seat 10 is fixed attempt to continue to move forward by mean of inertia force. At this time, each of the retention brackets 5, specifically, the front end surface of the rear wall 5b thereof, fixed to each of the upper rails 22 presses the rear wall 4b of the elastic case 4 and attempts to move further forward while compressing the rear wall 4b with the rear wall 56b of the gear box 56. However, according to the third embodiment, the two projections 15 are formed at the rear end surface of the rear wall 5b of each of the retention brackets 5. At a time the retention bracket 5 moves forward by a predetermined distance, the respective end surfaces of the projections 15 make contact with the rear end surface of the rear wall 56b of the gear box 56. As a result, the load is distributed to each of the upper rails 22 to thereby restrict the forward movement of each of the upper rails 22. The rear wall 4b is prevented from being damaged accordingly. Afterwards, each of the upper rails 22 and each of the retention brackets 5 attempt to move further forward via the gear box 56. However, because the drive nut 65 meshed with the screw shaft 26 that is fixed to each of the lower rails 21 cannot move forward, a large load is applied to the drive nut 65, which may lead to an excessive elastic deformation of the retention bracket 5 relative to the connected portion between the retention bracket 5 and the upper rail 22. At this time, according to the third embodiment, the cut-and-lifted portions 72 and 73 formed at the left and right longitudinal walls 22b of each of the upper rails 22 are arranged in the vicinity of the rear end surface of the rear wall 5b of the retention bracket 5. Thus, at a time the rear wall 5b of the retention bracket 5 is elastically deformed by the predetermined level, the rear end surface of the rear wall 5b of the retention bracket 5 makes contact with the respective front end surfaces of the cut-and-lifted portions 72 and 73, thereby distributing the load to the upper rail 22 and restricting the deformation of the retention bracket 5. As a result, each of the retention brackets 5 is prevented from being damaged and the reliability is enhanced. In addition, in a case where the vehicle is hit from behind, the front end surface of the front wall 5a makes contact with the respective rear end surfaces of the cut-and-lifted portion 70 and 71 at a time the front wall 5a of the retention bracket 5 is elastically deformed by the predetermined level, thereby distributing the load to the upper rail 22 and restricting the deformation of each of the retention brackets 5.

According to the third embodiment, the cut-and-lifted portions 70, 71, 72 and 73 are formed by bending the portions of the left and right longitudinal walls 22b. Thus, when an excessive load is applied to the drive nut 65 in the axial direction of the screw shaft 26, the load is distributed to each of the upper rails 22 by the respective rear end surfaces of the cut-and-lifted portions 70 and 71 to make contact with the front wall 5a of the retention bracket 5 or the respective front end surfaces of the cut-and-lifted portions 72 and 73 to make contact with the rear wall 5*b* of the retention bracket 5. Without an addition of a new component, the excessive load applied to the drive nut 65 is distributed to the upper rail 22. At the same time, the retention bracket 5 that supports the drive nut 65 is protected by a simple structure to thereby achieve a reduced cost while reliability is improved.

In addition, according to the third embodiment, the respective rear end surfaces of the cut-and-lifted portions 70 and 71 make contact with the front end surface of the retention bracket 5 and the respective front end surfaces of the cut-and-lifted portions 72 and 73 make contact with the rear end surface of the retention bracket 5 at a position away from the axial center of the screw shaft 26 relative to the connected portion between the upper rail 22 and the retention bracket 5, i.e., at a position below the horizontal plane that passes through the axial center of the screw shaft 26. Thus, when an excessive load is applied to the drive nut 65 in the axial direction of the screw shaft 26, the cut-and-lifted portions 70, 71, 72, and 73 stably receive the load in a balanced manner, thereby enhancing the reliability.

Further, according to the third embodiment, the respective rear end surfaces of the cut-and-lifted portions 70 and 71 are arranged in the vicinity of the front end surface of the retention bracket 5 and the respective front end surfaces of the cut-and-lifted portions 72 and 73 are arranged in the vicinity of the rear end surface of the retention bracket 5. Then, even when the excessive load is applied to the drive nut 65 in either the axially forward or rearward direction of the screw shaft 26, the respective rear end surfaces of the cut-and-lifted portions 70 and 71 make contact with the front end surface of the retention bracket 5 or the respective front end surfaces of the cut-and-lifted portions 72 and 73 make contact with the rear end surface of the retention bracket 5, thereby distributing the load to the upper rail 22. The retention bracket 5 that supports the drive nut 65 is protected and the reliability is enhanced. The bent grooves 96 and 97 and the inner portions 90 and 91 are initially formed at predetermined positions at the left and right longitudinal walls 22*b* of each of the upper rails 22. Then, the cut-and-lifted portions 70, 71, 72 and 73 are simply obtained by bending after the seat 10 is assembled on the upper rails 22. Thus, a reduction of assembly hours is achieved.

Furthermore, according to the third embodiment, the bent portions 70*a*, 71*a*, 72*a*, and 73*a* of the cut-and-lifted portions 70, 71, 72, and 73 of each of the upper rails 22 are arranged above the upper ends of the left and right flange walls 21*c* or the left and right side walls 21*b* of each of the lower rails 21. Thus, a working space for bending and forming the cut-and-lifted portions 70, 71, 72 and 73 after the seat 10 is assembled on the upper rails 22 is ensured. The bent grooves 96 and 97 are initially formed at the left and right longitudinal walls 22*b*, and then the cut-and-lifted portions 70, 71, 72 and 73 are bent to be formed after the seat 10 is assembled on the upper rails 22. The assembly performance is enhanced accordingly.

In the same manner as the second embodiment, the cut-and-lifted portions 70, 71, 72, and 73 formed at the left and right longitudinal walls 22*b* of each of the upper rails 22 may be arranged so that the bent grooves 96 and 97 are each formed into a substantially inverse U-shape. According to such structure, the same effect is also obtainable.

According to the aforementioned first and second embodiments, without an addition of a new component, an excessive load applied to the screw shaft 23 is distributed to the upper rails 22 only by cutting and bending the portions of the left and right longitudinal walls 22*b* of each of the upper rails 22. At the same time, the retention member 30 that holds the screw shaft 23 is simply structured, which leads to an improved reliability. Because the addition of a new component is not necessary, a reduced cost is also achieved.

According to the aforementioned third embodiment, without an addition of a new component, an excessive load applied to the drive nut 65 is distributed to the upper rail 22 only by cutting and bending portions of the left and right longitudinal walls 22*b* of each of the upper rails 22. At the same time, the retention bracket 5 that holds the drive nut 65 is simply structured, which leads to the improved reliability. Because the addition of a new component is not necessary, a reduced cost is achieved.

The cut-and-lifted portions 60, 61, 66, and 67 (85, 87, 88, and 89) or the cut-and-lifted portions 70, 71, 72, and 73 are arranged in the vicinity of the rear end surface of the fitting member 75.

Accordingly, in a case of a vehicle collision at a front side so that a collision impact is relatively large and that the seat 10 and the upper rails 2 fixed to the seat 10 continue to move forward by means of inertia force, the front end surface of the cut-and-lifted portions 60, 61, 66, 67, 85, 87, 88, 89 or the cut-and-lifted portions 70, 71, 72, and 73 provided at the upper rail 22 makes contact with the rear end surface of the fitting member 75 or the retention bracket 5, thereby distributing the load to the upper rail 22. The forward movement of the seat 10 is securely restricted. Thus, the retention member 30 that holds the screw shaft 23 or the retention bracket 5 that supports the drive nut 65 is protected, which leads to the improved reliability.

The cut-and-lifted portions 60, 61, 66, 67, 85, 87, 88, 89 make contact with the fitting member 75 at a position away from the axial center of the screw member 23 relative to the connected portion between the upper rail 22 and the retention member 30.

The cut-and-lifted portions 60, 61, 66, 67, 85, 87, 88, 89 make contact with the rear end surface or the front end surface of the fitting member 75 at a position below the horizontal plane L1 that passes through the rotational axis of the screw member 23.

The cut-and-lifted portions 70, 71, 72, and 73 make contact with the retention bracket 5 at a position away from the axial center of the screw member 26 relative to the connected portion between the upper rail 22 and the retention bracket 5.

The cut-and-lifted portions 70, 71, 72, and 73 make contact with the rear end surface or the front end surface of the retention bracket 5 at a position below the horizontal plane L1 that passes through the rotational axis of the screw member 26.

Accordingly, in a state where an excessive load is applied to the screw shaft 23 or the drive nut 65, the cut-and-lifted portions 60, 61, 66, 67, 85, 87, 88, 89 or the cut-and-lifted portions 70, 71, 72, 73 make contact with the fitting member 75 or the retention bracket 5, thereby stably receiving the load in a balanced manner.

The end portion 85*a*, 87*a*, 88*a*, 89*a* or the bent portion 60*a*, 61*a*, 66*a*, 67*a*, 70*a*, 71*a*, 72*a*, 73*a* each serving as a base point for bending of each of the cut-and-lifted portions 60, 61, 66, 67, 85, 87, 88, 89, 70, 71, 72, 73 are arranged above upper ends of the side walls 21*b* of the lower rail 21 in a state where the upper rail 22 engages with the lower rail 21.

Accordingly, a working space for bending and cutting the cut-and-lifted portions 60, 61, 66, 67, 85, 87, 88, 89, 70, 71, 72, 73 after the seat 10 is assembled on the upper rails 22 is ensured. Thus, only the bent grooves 94, 98, 96, 97 are formed at the left and right longitudinal walls 22*b* of the upper rail 22 beforehand, and then the cut-and-lifted portions 60, 61, 66, 67, 85, 87, 88, 89, 70, 71, 72, 73 are bent and formed after the seat 10 is assembled on the upper rails 22, which leads to the improved assembly performance.

The bent groove 94, 98 having a predetermined groove width and a U-shape is formed at each of the longitudinal walls 22b of the upper rail 22 to face the rear end surface of the fitting member 78.

The bent groove 96, 97 having a predetermined groove width and a U-shape is formed at each of the longitudinal walls 22b of the upper rail 22 to face the rear end surface of the retention bracket 5.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A power seat apparatus for a vehicle, comprising:
   a lower rail provided at a vehicle floor;
   an upper rail slidably supported by the lower rail and holding a seat for the vehicle;
   a screw member rotatably arranged between the lower rail and the upper rail and extending in a direction where the upper rail is slidable;
   a feed nut member fixed to the lower rail and meshed with the screw member;
   a retention member fixed to the upper rail;
   a fitting member rotatably held by the retention member and fixed to the screw member;
   a gear box mounted on the retention member and rotatably supporting an output rotation member that is rotatably connected to the screw member; and
   a drive unit transmitting a rotation drive force to the screw member by means of the output rotation member supported by the gear box; and
   first and second cut-and-lifted portions formed at first and second longitudinal walls of the upper rail respectively, the cut-and-lifted portions making contact with the fitting member when a load is applied to the screw member in an axial direction thereof to distribute the load to the upper rail, the cut-and lifted portions being formed by bending portions of the first and second longitudinal walls.

2. The power seat apparatus according to claim 1, wherein the first and second cut-and-lifted portions are arranged in a vicinity of a rear end surface of the fitting member.

3. The power seat apparatus according to claim 1, wherein the first and second cut-and-lifted portions make contact with the fitting member at a position away from an axial center of the screw member relative to a connected portion between the upper rail and the retention member.

4. The power seat apparatus according to claim 3, wherein the first and second cut-and-lifted portions make contact with a rear end surface or a front end surface of the fitting member at a position below a horizontal plane that passes through a rotational axis of the screw member.

5. The power seat apparatus according to claim 1, wherein an end portion or a bent portion serving as a base point for bending of each of the cut-and-lifted portions is arranged above upper ends of first and second longitudinal walls of the lower rail in a state where the upper rail engages with the lower rail.

6. The power seat apparatus according to claim 1, wherein a bent groove having a predetermined groove width and a U-shape is formed at each of the first and second longitudinal walls of the upper rail to face a rear end surface of the fitting member.

\* \* \* \* \*